(12) United States Patent
Mieney et al.

(10) Patent No.: US 6,680,136 B2
(45) Date of Patent: Jan. 20, 2004

(54) GAS CONTAINMENT/CONTROL VALVE FOR A SOLID OXIDE FUEL CELL

(75) Inventors: Harry R. Mieney, Byron, NY (US); Karl J. Haltiner, Jr., Fairport, NY (US)

(73) Assignee: Delphi Technologies, Inc., Troy, MI (US)

(*) Notice: Subject to any disclaimer, the term of this patent is extended or adjusted under 35 U.S.C. 154(b) by 177 days.

(21) Appl. No.: 09/769,538

(22) Filed: Jan. 25, 2001

(65) Prior Publication Data

US 2002/0098400 A1 Jul. 25, 2002

(51) Int. Cl.$^7$ ................................................. H01M 8/04
(52) U.S. Cl. ........................................... 429/13; 429/12
(58) Field of Search ....................................... 429/12, 13

(56) References Cited

U.S. PATENT DOCUMENTS

| | | | |
|---|---|---|---|
| 3,959,019 A | * | 5/1976 | Miyoshi et al. ................. 429/19 |
| 4,528,251 A | * | 7/1985 | Yamaguchi et al. ........... 429/22 |
| 5,366,821 A | | 11/1994 | Merritt et al. |
| 5,441,821 A | | 8/1995 | Merritt et al. |
| 5,503,944 A | * | 4/1996 | Meyer et al. ................... 429/13 |

* cited by examiner

Primary Examiner—Carol Chaney
(74) Attorney, Agent, or Firm—Jimmy L. Funke

(57) ABSTRACT

A method and apparatus for supplying and containing a flow of reducing gas within a fuel cell is disclosed for a fuel cell having a gas control valve system comprising a fuel cell unit, an inlet and an outlet coupled to the fuel cell unit, an actuator disposed in the gas control valve, and a reducing gas supply for actuating said actuator and for regulating fuel to the fuel cell unit.

16 Claims, 3 Drawing Sheets

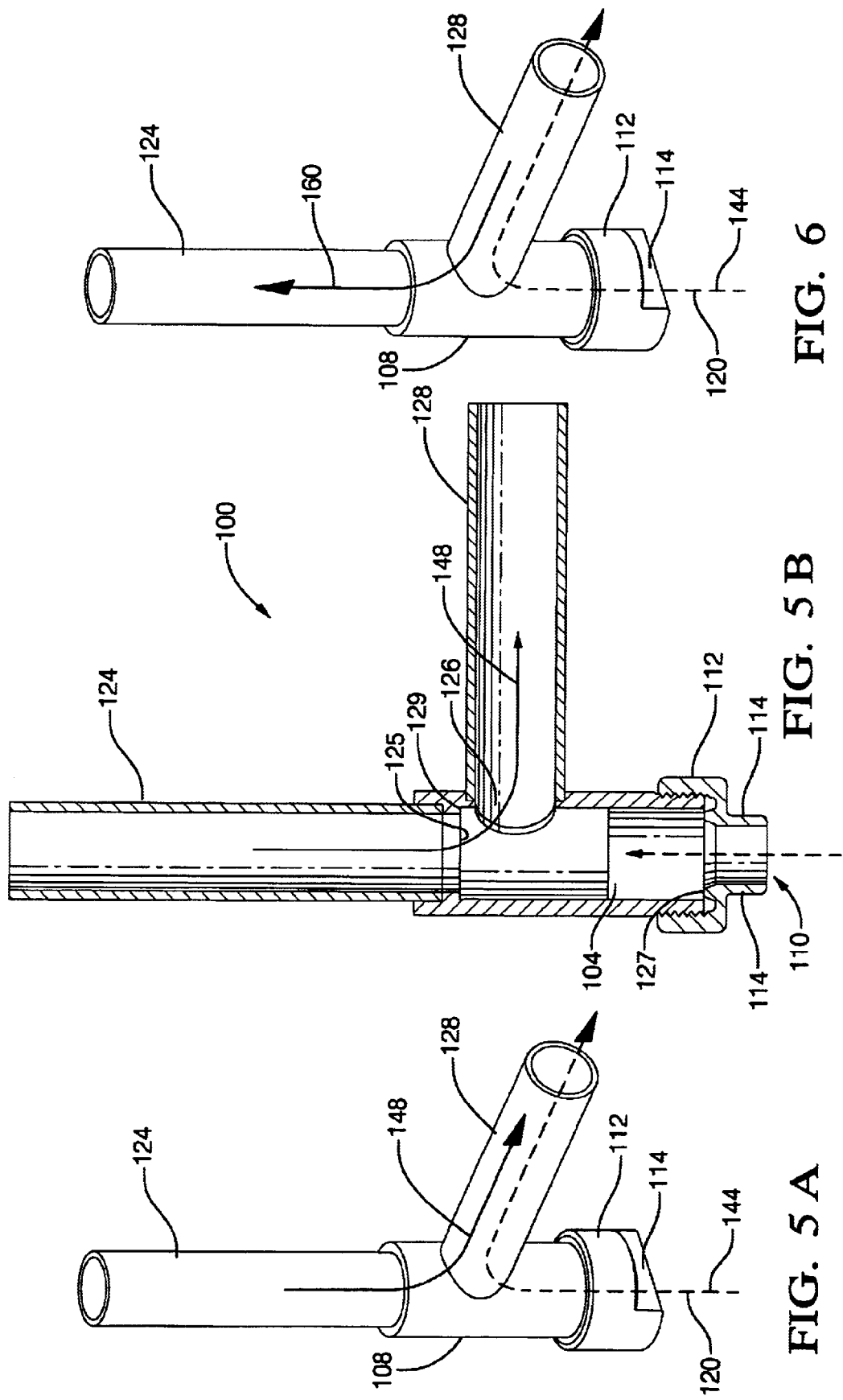

GAS CONTAINMENT/CONTROL VALVE FOR A SOLID OXIDE FUEL CELL

TECHNICAL FIELD

The present disclosure relates to solid oxide fuel cells, and more particularly relates to a gas control valve used in solid oxide fuel cells.

BACKGROUND

A fuel cell is an energy conversion device that generates electricity and heat by electrochemically combining a gaseous fuel, such as hydrogen, carbon monoxide, or a hydrocarbon, and an oxidant, such as air or oxygen, across an ion-conducting electrolyte. The fuel cell converts chemical energy into electrical energy. A fuel cell generally consists of two electrodes positioned on opposites of an electrolyte. The oxidant passes over the oxygen electrode (cathode) while the fuel passes over the fuel electrode (anode), generating electricity, water, and heat.

The automotive industry has turned to fuel cells, particularly solid oxide fuel cells (SOFCs), to help power automobiles and reduce emissions. SOFCs are constructed entirely of solid-state materials, utilizing an ion conductive oxide ceramic as the electrolyte. A conventional electrochemical cell in a SOFC is comprised of an anode and a cathode with an electrolyte disposed therebetween. In a typical SOFC, a fuel flows to the anode where it is oxidized by oxide ions from the electrolyte, producing electrons that are released to the external circuit, and mostly water and carbon dioxide are removed in the fuel flow stream. At the cathode, the oxidant accepts electrons from the external circuit to form oxide ions. The oxide ions migrate across the electrolyte to the anode. The flow of electrons through the external circuit provides for consumable or storable electricity. However, each individual electrochemical cell generates a relatively small voltage. Higher voltages are attained by electrically connecting a plurality of electrochemical cells in series to form a stack.

The SOFC stack also includes conduits or manifolds to allow passage of the fuel and oxidant into the stack, as well as excess fuel and oxidant with byproducts, out of the stack. Generally, oxidant is fed to the structure from a manifold located on one side of the stack, while fuel is provided from a manifold located on an adjacent side of the stack. The fuel and oxidant are generally pumped through the manifolds and introduced to a flow field disposed adjacent to the appropriate electrode. The flow fields that direct the fuel and oxidant to the respective electrodes typically create oxidant and fuel flows across the electrodes that are perpendicular to one another.

Seals must be provided around the edges of the various cell stack components to inhibit crossover of fuel and/or oxidant. For example, seals are disposed between the electrodes and adjacent flow fields, around manifolds, between flow fields and cell separators, and elsewhere. One factor in establishing SOFC reliability is the integrity of these seals.

Leaks in the manifold seals, electrochemical seals, or other defects that allow air (oxygen) in can lead to the SOFC failure. When the concentration of oxygen on the anode side forms an oxidizing environment, anode oxidation can occur, creating a volume change that results in mechanical failure of the electrochemical cell. To address this problem, conventional electrochemical cells provide a continuous supply of fuel (or reformate) to continue to provide hydrogen to the anode (i.e., maintaining a reducing environment) and inhibit anode oxidation. However, during transition periods of shut down and start up, generally the reformate is not present in the fuel cell and the concentration of oxygen can be elevated, causing anode oxidation, particularly when the temperature exceeds 200° C.

What is needed in the art is a method of protecting the anode from anode oxidation during start up and shut down periods.

SUMMARY

A method and apparatus are disclosed herein utilizing a gas control valve to regulate and contain reducing gas flow to the anode for anode protection. A fuel cell having a gas control valve, the fuel cell comprising a fuel cell unit, an inlet and an outlet coupled to the fuel cell unit, an actuator disposed in the gas control valve, and a reducing gas supply for actuating the actuator for regulating gas to the fuel cell unit. A method of reducing anode oxidation utilizing at least one gas control valve is also disclosed herein.

BRIEF DESCRIPTION OF THE DRAWINGS

Referring now to the drawings wherein like elements are numbered alike in the several Figures.

FIG. 5A is a view of a gas control valve depicting gas flow when connected to an inlet of a fuel cell;

FIG. 5B is a view of a gas control valve utilizing a slug depicting gas flow when connected to an inlet of a fuel cell; and FIG. 6 is a view of a gas control valve depicting gas flow when connected to an outlet of a fuel cell.

DETAILED DESCRIPTION

To meet the needs of automobiles, fuel cells have begun to help to provide auxiliary electric in power vehicles. Fuel cells can provide an instant source of electrical power to meet the needs of automobiles. Fuel cells require a fuel source (or reformate) and a source of air (or oxygen) to operate and need monitoring the concentrations of both to prevent the fouling (or breakdown) of the fuel cell. Since different types of SOFC systems exist, including tubular and planar systems, any reference to a particular cell configuration is intended to also represent similar components in other cell configurations, where applicable.

Generally, the system may comprise at least one SOFC, an engine, one or more heat exchangers, and optionally, one or more compressors, an exhaust turbine, a catalytic converter, preheating device, plasmatron, electrical source (e.g., battery, capacitor, motor/generator, turbine, and the like, as well as combinations comprising at least one of the foregoing electrical sources), and conventional connections, wiring, control valves, and a multiplicity of electrical loads, including, but not limited to, lights, resistive heaters, blowers, air conditioning compressors, starter motors, traction motors, computer systems, radio/stereo systems, and a multiplicity of sensors and actuators, and the like, as well as conventional components.

Figure 1:
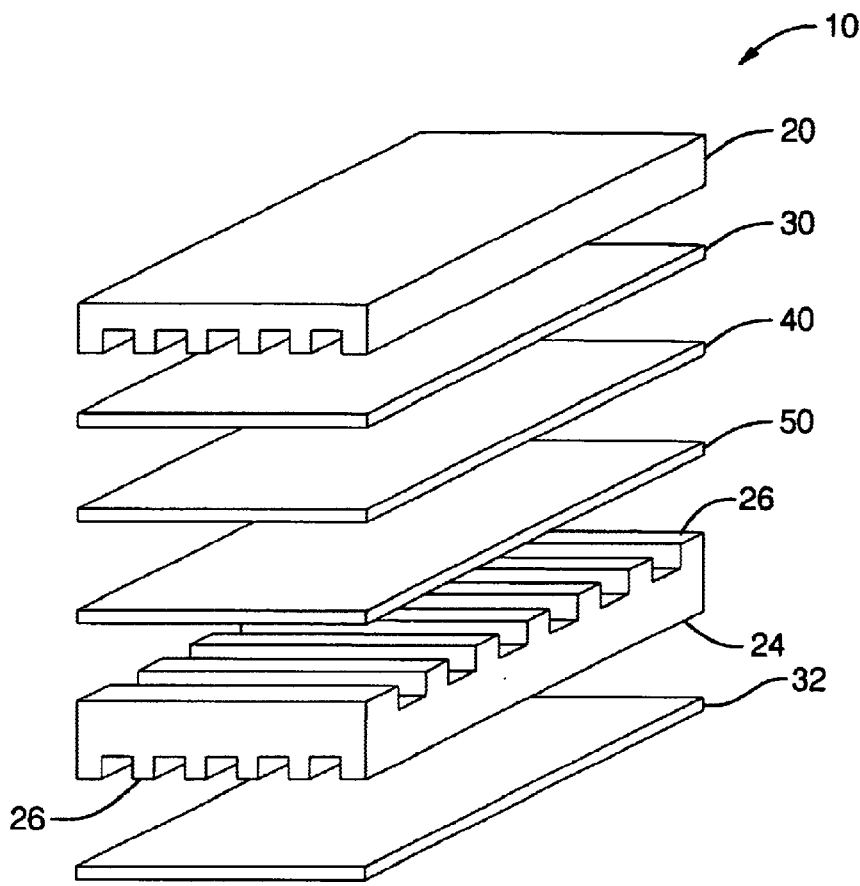
FIG. 1 is a view of an electrochemical cell of a SOFC.

One configuration of a SOFC includes a stack of planar SOFC units. An electrochemical cell stack 10 is illustrated in FIG. 1. A fuel cell unit 8 comprises a fuel electrode or anode 30 and an oxygen electrode or cathode 50 that are disposed on opposite sides of a solid electrolyte 40. An end cap 20 includes a surface 22 that is configured for disposal adjacent to the anode 30 for both electrical contact and also to provide fuel distribution. An interconnect 24 includes a first interconnect surface 26, and a second interconnect surface 28. Surface 26 is configured for disposal adjacent to the cathode 50 to provide oxidant distribution and electrical contact, and surface 28 is configured for disposal adjacent to an anode 32 of another SOFC. Anode 32 is disposed adjacent to interconnect 22 to illustrate the placement of and ability to stack several electrochemical cells in electrical connected to electrochemical cell 10.

The solid electrolyte 40 of the electrochemical cell 10 can be an ion conductor capable of transporting oxide ions from the cathode 50 to the anode 30, and is compatible with the environment in which the SOFC will be utilized (e.g., temperatures from about −40° C. up to about 1,000° C.). Generally, solid electrolyte materials include conventional materials, such as ceramics and/or metals (e.g., alloys, oxides, gallates, and the like), including zirconium, yttrium, calcium, magnesium, aluminum, rare earths, and the like, as well as oxides, gallates, aluminates, combinations, and composites comprising at least one of the foregoing materials. Preferably the electrolyte is a rare earth oxide (such as yttria, gadolinia, neodymia, ytterbia, erbia, ceria, and the like) doped with aliovalent oxide(s) (such as magnesia, calcia, strontia, and the like, and other $^{+2}$ valence metal oxides).

The anode 30 and cathode 50, which form phase boundaries (gas/electrolyte/catalyst particle; commonly known as triple points) with the electrolyte 40, can be disposed adjacent to or integral with the electrolyte 40. The anode 30 and cathode 50 are generally formed of a porous material capable of functioning as an electrical conductor and capable of facilitating the appropriate reactions. The porosity of these materials should be sufficient to enable dual directional flow of gases (e.g., to admit the fuel or oxidant gases and permit exit of the byproduct gases), with a porosity of about 20% to about 40% porous, typically preferred.

The electrochemical cell 10 can be electrically connected with other electrochemical cells by using, for example, interconnect 24. Depending upon the geometry of the SOFC, the fuel and the oxidant flow to the anode or cathode (as appropriate) via the passageways of end cap 20 and the interconnect 24. The end cap 20 and the interconnect 24 are generally formed of a material capable of withstanding the pressures and temperatures of the SOFC, and capable of conducting electricity.

Each individual electrochemical cell 10 comprising a single anode 30, a single electrolyte 40, and a single cathode 50, generates a relatively small voltage, generally from about 0.6 to about 0.9 volts. Higher voltages are attained by electrically connecting a plurality of electrochemical cells in series to form a stack. The total number of cells forming a stack can range from 2 to several hundred, depending on power requirements, space and weight restrictions, economics, and the like.

Figure 2:
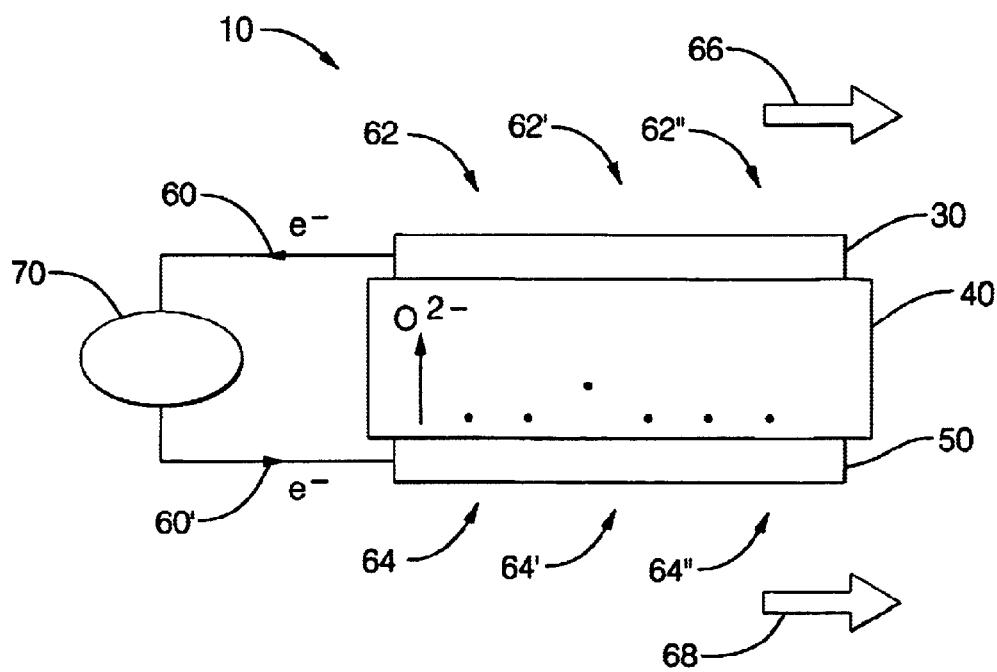
FIG. 2 is a view of an electrochemical cell of a SOFC in operation.

In operation, the electrochemical cell 10 produces a current flow as illustrated by current flow arrows 60, 60′ in FIG. 2. Oxidant gases, such as oxygen or air, can be introduced to the cathode side of the cell, flowing as illustrated by the oxidant flow arrows 64, 64′, 64″. The oxidant receives the flowing electrons (e$^-$) and converts them into oxide ions (O$^{-2}$), which diffuse through the electrolyte 40 to the anode 30, as depicted in the following reaction:

$$O_2 + 4e^- \rightarrow 2O^{-2}$$

At the anode, the oxide ions react with a fuel, such as hydrogen, carbon monoxide, methane, or other hydrocarbons, which was introduced to the electrochemical cell 10 as illustrated by the fuel flow arrows 62, 62′, 62″. The reaction of the fuel and oxide ions, producing electrons (e$^-$), which flow outside of the electrochemical cell 10 to the external circuit 70 and back to the cathode 50. The fuel/oxide ion reaction is depicted in the following reactions:

$H_2 + O^{-2} \rightarrow H_2O + 2e^-$ [when fuel is hydrogen]

$CO + O^{-2} \rightarrow CO_2 + 2e^-$ [when fuel is carbon monoxide]

$CH_4 + 4O^{-2} \rightarrow 2H_2O + CO_2 + 8e^-$ [when fuel is methane]

Unreacted fuel and byproducts, such as water or carbon monoxide, exit the electrochemical cell 10 in the fuel stream, as illustrated by fuel stream arrow 66, while excess oxidant exits the electrochemical cell 10, as illustrated by oxidant stream arrow 68.

The electrolyte 40 conducts these oxide ions (O$^{-2}$) between the anode 30 and the cathode 50, maintaining an overall electrical charge balance. The cycle of flowing electrons (e$^-$) from the anode 30 through the external circuit 70 to the cathode 50 creates electrical energy for harnessing.

To facilitate the reaction in the fuel cell, a direct supply of the fuel, such as hydrogen, carbon monoxide, or methane, is preferred. However, concentrated supplies of these fuels are generally expensive and difficult to supply. Therefore, the specific fuel can be supplied by processing a more complex source of the fuel. The fuel utilized in the system is typically chosen based upon the application, expense, and availability. Possible sources of fuel include conventional fuels such as hydrocarbon fuels, including, but not limited to, conventional liquid fuels, such as gasoline, diesel, ethanol, methanol, kerosene, and others; conventional gaseous fuels, such as natural gas, propane, butane, and others; and alternative fuels, such as hydrogen, biofuels, dimethyl ether, and others; and combinations comprising at least one of the foregoing fuels. The preferred fuel is typically based upon the power density of the engine, with lighter fuels, i.e., those which can be more readily vaporized and/or conventional fuels which are readily available to consumers, generally preferred.

While the fuel cell operates, oxide ions flow through the electrolyte 40 to the anode 30 to combine with components of the fuel (e.g., H$_2$ or carbon monoxide) to produce residual components, such as water and CO$_2$. These components exit the electrochemical cell 10 in the fuel stream 66. As long as an adequate supply of fuel is present, excess oxide ions will leave the electrochemical cell 10. However, when the fuel supply is not flowing, excess oxide ions can be present on the anode side of the electrochemical cell 10, resulting in the breakdown of the anode (i.e., anode oxidation). The excess oxide ions result from oxygen remaining from the prior use of the fuel cell or from air leaking in from the manifold seals, electrochemical seals, or other defects. When anode oxidation occurs, the anode oxidizes rapidly, creating a volume change, which can result in a mechanical failure of the electrochemical cell 10. Likewise, anode oxidation will also occur during transition periods of shut down and start up when the temperature of the anode is above 200° C.

To reduce the possibility of anode oxidation during shut down and start up when temperatures exceed 200° C., a bias of hydrogen-based fuel can be applied to the electrochemical cell to pump hydrogen to the anode side. The hydrogen-based fuel may be applied to the fuel stream through an inlet or outlet of the fuel cell. This keeps the anode in a reducing environment (e.g., hydrogen rich). It is preferable, under certain conditions, to utilize a supplementary containment gas preferably comprising of about 5–10% hydrogen and the balance comprising one of argon and nitrogen during transitional periods of shut down or start up when temperatures exceed 200° C.

Figure 3:
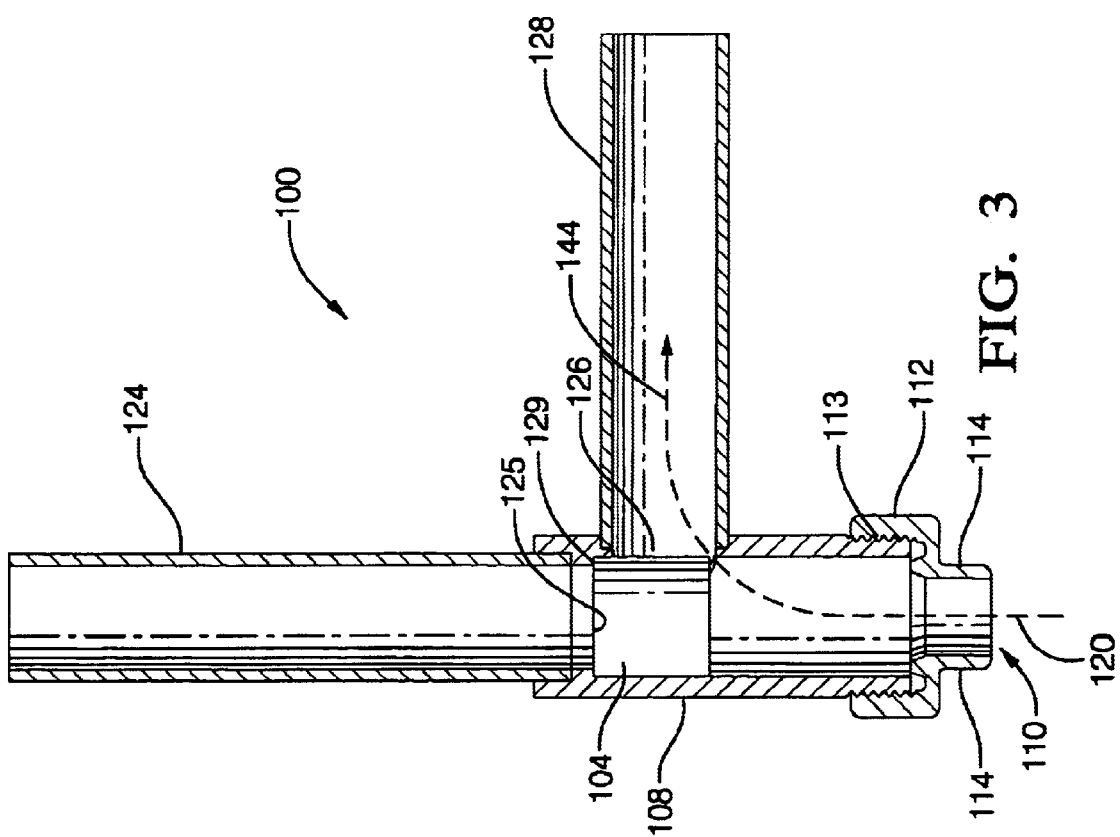
FIG. 3 is a view of a preferred embodiment of a gas control valve utilizing a slug as a moving actuator.

Referring to FIG. 3, a preferred embodiment of a gas control valve 100 for regulating the supply of a hydrogen rich reducing environment is shown having a slug (e.g., piston) 104 slidably engaged within a cylinder portion 108. It will be understood that cylinder portion 108 is preferably cylindrically shaped, however, cylinder portion 108 optionally includes at least an inside bore or the inside bore and outside surface having configurations other than a cylinder, including but not limited to triangular, rectangular and other polyhedral configurations with a complementary shaped slug 104. The slug 104 acts as a moving actuator to control the flow and source of gas (fuel) within a fuel cell or other device (not shown). Cylinder portion 108 has a motive inlet port 110 at one end of the cylinder portion 108 allowing a containment/actuation gas to enter cylinder portion 108 and actuate the slug 104. The cylinder portion 108 proximate the motive inlet port 110 further includes a cap 112 depending therefrom to provide access for service or replacement of an actuator, i.e. the slug 104. The cap 112 includes threads 113 in an interior portion with a diameter larger than the outside diameter of the cylinder portion 108 to engage with complementary threads 115 an exterior bottom portion of cylinder portion 108 providing for a positive seal engagement with the cap. An exterior portion of the cap 112 includes flats 114 for engagement with a tool to tighten or loosen the cap when installing or removing the cap 112. The cap 112 further has an opening to allow containment/actuation gas (fuel) from a reducing gas supply 120 entering the motive inlet port 110 of the cylinder portion 108 to translate the slug within the cylinder portion 108 dependent on a pressure of the gas (fuel) from the gas supply 120 and also to supply fuel from reducing gas supply 120 to the fuel cell. The cylinder portion 108 has tubing 124 extending therefrom at an opposite end of the motive inlet port 110 connecting to other parts of the system that supply or receive flow from the fuel cell in normal operation. An end portion of tubing 124 disposed within cylinder portion 108 is configured to engage with an inside diameter bore of cylinder portion 108. A portion of the inside diameter bore of cylinder bore 108 is reduced providing a positive seal when the slug 104 is actuated against a seat 125 that is part of a shoulder 129 formed by a reduced inside diameter bore of cylinder portion 108. The seat 125 within cylinder portion 108 prevents gas flow to or from tubing 124 when slug 104 is actuated to engage seat 125. The junction of the seat 125 and the slug 104 in cylinder portion 108 forms a positive seal to prevent any gas leakage. The cylinder portion 108 further includes a fuel cell port 126 disposed intermediate of one end and the opposite end to receive tubing 128, horizontally disposed, for connection to an inlet or an outlet of a fuel cell (not shown) via tubing 128. A portion of tubing 128 depending from fuel cell port 126 is configured to fit the fuel cell port 126 without entering cylinder portion 108, thus allowing the slug 108 to translate within the cylinder portion 108 without interference from tubing 128.

Figure 4:
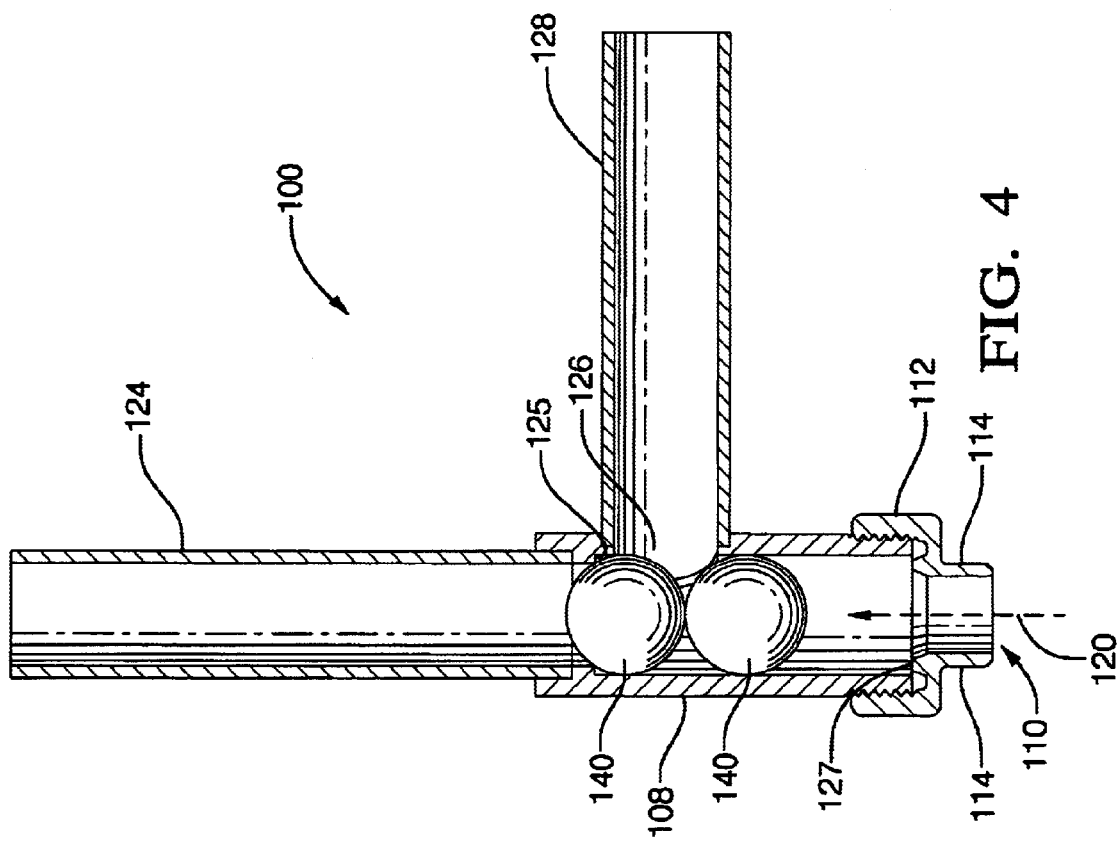
FIG. 4 is a view of an alternative embodiment of a gas control valve utilizing precision balls as a moving actuator.

An alternative embodiment of a gas control valve 100 utilizing two precision balls 140 as the moving actuator within cylinder portion 108 is shown in FIG. 4. The precision balls 140 slidably engage within the cylinder portion 108. The balls 140 translate in substantial unity as a moving actuator to control the flow of fuel within a fuel cell or other device (not shown) providing a predetermined flow rate and gas (fuel) source. Cylinder portion 108 has a motive inlet port 110 at one end of the cylinder portion 108 allowing gas to enter cylinder portion 108 and actuate the balls 140. The cylinder portion 108 near the motive inlet port 110 further includes a cap 112 depending therefrom for access to service or replace an actuator, i.e. the balls 140. The cap 112 also includes threads 113 in an interior portion to engage with threads 115 on an exterior bottom portion 116 of cylinder portion 108 for engagement with the cap. An exterior portion of the cap 112 includes flats 114 for engagement with a tool (not shown) to tighten or loosen the cap when installing or removing the cap 112. The cap 112 further allows gas (fuel), as discussed in the above embodiment, from a reducing gas supply 120 to enter the cylinder portion 108 and thereby translate the balls 140 within the cylinder portion 108 dependent on a pressure of the gas supply 120. The cylinder portion 108 has tubing 124 extending therefrom at an opposite end of the motive inlet port 110 connecting to other parts of the system that supply or receive fuel flow from the fuel cell. An end portion of tubing 124 disposed within cylinder portion 108 is configured to engage with an inside diameter bore of cylinder portion 108. A portion of the inside diameter bore of cylinder bore 108 is reduced providing a positive seal when the balls 140 are actuated against a seat 125 that is part of a shoulder 129 formed by a reduced inside diameter bore of cylinder portion 108. The seat 125 within cylinder portion 108 prevents gas flow to or from tubing 124 when balls 140 are actuated to engage seat 125. The junction of the seat 125 and one of the balls 140 in cylinder portion 108 forms a positive seal to prevent any gas leakage. A portion of tubing 128 depending from fuel cell port 126 is configured to fit the fuel cell port 126 without entering cylinder portion 108, thus allowing the balls 140 to translate within the cylinder portion 108. In addition, the junction of tubing 124 in cylinder portion 108 is positively sealed. The cylinder portion 108 further includes a fuel cell port 126 disposed intermediate of one end and the opposite end to receive tubing 128, horizontally disposed, for connection to an inlet or an outlet of a fuel cell (not shown).

In operation, the reducing gas supply 120 pressure is controlled by a controller (not shown) that actuates the actuator, i.e., the slug 104 or balls 140, housed in the cylinder portion 108. In a preferred embodiment (referring to FIG. 3), slug 104 is mechanically actuated by the flow force acting on the bottom portion surface 130 of slug 104 which causes the slug 104 to lift once the reducing gas supply 120 reaches or exceeds a predetermined pressure or flow rate, dependent upon the bias acting on the slug 104. It should be noted that gas control valve 100 is preferably oriented as shown in FIG. 3 and preferably utilizing gravity to bias slug 104, wherein gravity is biasing slug 104 towards motive inlet port 110. Because the gas control valve 100 is mechanically actuated in response to the observed flow force (pressure) of the containment/actuation reducing gas from gas supply 120, the slug 104 may be conveniently tuned so that the slug or other actuator lifts at any given predetermined flow force. For example, a spring (not shown) may be disposed on an opposite surface 132 of the slug 104 biasing slug towards motive inlet port 110.

If the pressure is sufficient enough, the reducing gas supply 120 will force the actuator, to engage the seat 125 at the opposite end having tubing 124 connecting to other parts of the system, thereby preventing normal gas flow to or from tubing 124 (FIGS. 3 and 4). Normal gas flow is defined dependent on whether a gas control valve is depending from an inlet or an outlet of a fuel cell. When a gas control valve 100 is depending from a fuel cell inlet, normal gas flow is defined as reformate entering tubing 124 and biased to flow towards cylinder portion 108 and then into fuel cell inlet through tubing 128. When a gas control valve 100 is depending from a fuel cell outlet, normal gas flow is defined as spent and unreacted fuel (reformate) exiting the fuel cell via outlet into tubing 128 biased to flow towards cylinder portion 108 and then out tubing 124 to a waste energy recovery (WER) unit, a combustor, to utilize the thermal energy of the unreacted fuel by combustion of the same.

FIG. 5A depicts a gas control valve 100 detailing gas flow when tubing 128 is connected to a fuel stream inlet of a fuel cell. A pressurized reducing fuel/gas supply 120 is connected via cap 112 to motive inlet port 110 supplying a pressurized containment/actuation gas (fuel) 144 inside cylinder portion 108. Without a flow force (pressure) on the bottom surface portion 130, the slug 104 is biased against a second seat 127 thereby preventing normal gas flow out of inlet port 110 when positioned against second seat 127, wherein cylinder portion 108 is oriented to allow slug 104 to translate in a vertical axis relative to the earth's center allowing gravity to bias the slug 104 against the cap 112 as illustrated in FIG. 5B. Another potential bias acting in the same direction as gravity results from any pressure associated with the reformate fuel stream acting as the normal flow 148 via tubing 124 and cylinder portion 108 acting on an upper portion 132 of the slug 104 pushing towards cap 112. As the pressure of the containment/actuation gas 144 increases, the force acting on a bottom portion 130 surface of slug 104 increases and at a selected pressure translates slug 104 towards seat 125, thereby restricting normal flow 148 of reformate into fuel cell. It should be noted, however, that reducing gas 120 leaks past slug 104 via the space between slug 104 and cylinder portion 108 as depicted by the phantom lines in FIG. 3 when the slug 104 is seated against seat 125. This leakage of reducing gas travels to tube 128 and into the fuel cell.

The pressure of the containment/actuation gas controls the translation within the cylinder portion 108 that the moving actuator translates, thereby controlling flow or allowing a mixture between normal flow and containment flow. If the pressure of the containment/actuation flow is sufficient, the moving actuator can seal off the normal flow completely and thereby allow only the containment/actuation gas to enter the fuel stream inlet as depicted in FIGS. 3 and 4. Seats 125, 127 disposed at the one end and the opposite end of cylinder portion 108 when the seats are engaged with the slug 104 and positively seal and prevent the flow of gas when the slug is actuated against either seal with a predetermined sufficient pressure create a positive seal.

Turning to FIG. 6, a gas control valve 100 is shown detailing gas flow when tubing 128 is connected to a fuel stream outlet of a fuel cell. A pressurized reducing gas supply 120 is connected to motive inlet port 110 supplying a pressurized containment/actuation gas 144 inside cylinder portion 108. In a preferred embodiment, slug 104 (FIG. 3) is biased against the cap 112 restricting the flow of gas 144 by its orientation within cylinder portion 108, wherein cylinder portion 108 is oriented to allow slug 104 to translate in a vertical axis relative to the earth's center allowing gravity to bias the slug 104 against the cap 112. An unreacted fuel stream depicts the normal flow 160 as the unreacted fuel leaves the fuel cell outlet and enters cylinder portion 108 where it further enters tubing 124 as a path of least resistance. The unreacted fuel is further combusted in a Waste Energy Recovery (WER) unit to utilize the resulting thermal energy from combustion of the unreacted fuel. As the pressure of the gas 144 increases, the force acting on a bottom portion surface 130 of slug 104 increases and at a selected pressure translates slug 104 towards seat 125, thereby restricting normal flow 160 out of the fuel cell.

The pressure of the containment/actuation gas controls the translation within the cylinder portion 108 that the moving actuator translates, thereby controlling flow or allowing a mixture between normal flow and containment flow. If the pressure of the containment/actuation flow is sufficient, the moving actuator can seal off the normal flow completely and thereby allow only the containment/actuation gas to enter the fuel stream outlet as depicted in FIGS. 3 and 4.

In an exemplary embodiment, a fuel cell comprises two gas control valves 100, one disposed at the inlet to the fuel cell, the other disposed at the outlet of the fuel cell. When the fuel cell is in transition from start-up to shut-down and the temperatures exceed 200° C. when anode oxidation initiates absent a reducing environment, it is desired to control the amount of hydrogen based fuel/gas supplied to the anode to reduce the potential for such oxidation. Utilization of two gas control valves alleviates anode oxidation by saturating the anode with a hydrogen-based reducing gas through the inlet and outlet. Utilization of the gas control valve permits variation of the flow of hydrogen based containment/actuation gas, as well as varying the flow of reformate into the fuel cell and flow of unreacted fuel out of the a fuel cell in a compact design, as well as insuring a constant supply of reducing gas to prevent anode oxidation that will extend the life and improve performance of a fuel cell. An exemplary embodiment measures 1" by 3" without the ¾" tubing attached. Suitable gas control valves can be formed of 316 stainless steel, or superalloys, such as, but not limited to, Inconel 600, Inconel 625, Haynes 214, Haynes 230, Hastealloys, Incoloy MA956, and the like; that are capable of withstanding automobile operating conditions (e.g., temperatures of about −40° C. to about 1,000° C.); and are compatible with the oxidizing or reducing nature of the fuel cell environment.

A method is also described herein for supplying and containing a flow of reducing gas within a solid oxide fuel cell utilizing a gas control valve comprising: disposing an electrochemical cell having an anode and a cathode on opposite sides of an electrolyte; disposing at least one gas control valve having a first opening with a reducing gas supply having variable pressure and a second opening in fluid communication with the electrochemical cell; disposing a flow of oxidant to said cathode; disposing the reducing gas in fluid communication with the anode; actuating an actuator in the at least one gas control valve with the variable gas supply pressure; and regulating the flow of reducing gas to the electrochemical cell by varying the gas supply pressure actuating the actuator in the at least one gas control valve; and controlling the flow of the reducing gas that is pumped to the anode for preventing anode oxidation. The reducing gas comprises a hydrogen based fuel comprising preferably 5% hydrogen and the balance comprising argon or nitrogen, and combinations of the forgoing comprising at least hydrogen as one of the foregoing fuels. In a preferred method, a first gas control valve is disposed to an inlet and a second gas control valve is disposed to an outlet to the solid oxide fuel cell for supplying and containing a reducing gas in a fuel cell to prevent anode oxidation. Furthermore, each gas control valve includes a third opening for allowing flow of either a primary fuel source into the fuel cell (a first flow), or unreacted fuel out of the fuel cell (a second flow), the flow direction of each is dependent on whether the valve is disposed to an inlet or an outlet of the electrochemical cell. The flow of fuel is also dependent on the respective positions of the actuators in said first and second gas control valves regulating gas flow from at least two sources.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. A fuel cell having a gas control valve, the fuel cell comprising:
    a fuel cell unit;
    an inlet coupled to said fuel cell unit;
    an outlet coupled to said fuel cell unit;
    a mechanical movable actuator disposed in the gas control valve; and
    a reducing gas supply supplying gas for actuating maid actuator and for regulating gas to the fuel cell unit.
2. The fuel cell as in claim 1 wherein said fuel cell unit includes;
    a cathode;
    an anode spaced from said cathode; and
    an electrolyte disposed between said cathode and said anode.
3. The fuel cell as in claim 1 wherein the gas control valve comprises:
    a cylinder portion;
    an inlet port disposed in said cylinder portion;
    a fuel stream port disposed in said cylinder portion;
    a fuel cell port disposed in said cylinder portion; and
    an actuator slidably disposed within said cylinder portion for varying fuel concentration within a fuel cell stack.
4. The fuel cell as in claim 1 wherein said actuator is one of a slug and a ball.
5. The fuel cell as in claim 1 wherein said actuator comprises two balls.
6. The fuel cell as in claim 1 wherein said fuel cell is a solid oxide fuel cell including at least one said fuel cell unit making up a part or all of said fuel cell.
7. The fuel cell as in claim 1 wherein one gas control valve is depending from said inlet and a second gas control valve is depending from said outlet.
8. A fuel cell gas control valve for regulating fuel concentration in a fuel cell comprising:
    a fuel cell stack, said fuel cell stack including a plurality of fuel cell units and at least one gas control valve depending from said fuel cell stack; said at least one gas control valve is at least a portion of at least one of said plurality of fuel cell units, said at least one gas control valve including;
    a cylinder portion;
    an inlet port disposed in said cylinder portion;
    a fuel stream port disposed in said cylinder portion;
    a fuel cell port disposed in said cylinder portion; and
    a mechanical movable actuator slidably disposed within said cylinder portion configured to vary fuel concentration within a fuel cell stack, wherein said inlet and fuel stream ports are in fluid communication with said fuel cell port within said cylinder portion.
9. The fuel cell gas control valve for regulaling fuel concentration in a fuel cell as in claim 8 wherein maid fuel cell stack is a solid oxide fuel cell.
10. The fuel cell gas control valve for regulating fuel concentration in a fuel cell as in claim 8 wherein said actuator is one of a slug and a ball.
11. The fuel cell gas control valve for regulating fuel concentration in a fuel cell as in claim 8 wherein maid actuator comprises two balls.
12. The fuel cell gas control valve for regulating fuel concentration in the fuel cell of claim 8 wherein said motive inlet port and said fuel stream port are disposed on opposite ends of said cylinder portion and said fuel cell port is disposed between said motive inlet port and said fuel stream port.
13. A method of supplying and containing a flow of reducing gas within a fuel cell utilizing a gas control valve comprising:
    disposing an electrochemical cell having an anode and a cathode on opposite sides of an electrolyte;
    disposing at least one gas control valve having an inlet port in fluid communication with a reducing gas supply having variable pressure and a fuel cell port in fluid communication with said electrochemical cell;
    disposing a flow of oxidant to said cathode;
    disposing said flow of reducing gas to said anode;
    actuating a mechanical movable actuator in said at least one gas control valve with said variable gas supply pressure;
    regulating said flow of reducing gas to the eloctrochemical cell by varying said gas supply pressure actuating said actuator; and controlling the flow of said reducing gas that is pumped to said anode for preventing anode oxidation.
14. The method of claim 13, wherein said reducing gas comprises a hydrogen based fuel comprising hydrogen and a balance comprising one of argon and nitrogen.
15. The method of claim 13, wherein a first gas control valve is disposed to an inlet and a second gas control valve is disposed to an outlet to the solid oxide fuel cell for supplying and containing a flow of reducing gas in the fuel cell to prevent anode oxidation.
16. The method of claim 15, wherein said first gas control valve further comprises a fuel stream port in fluid communication with a first flow of fuel to the fuel cell, and said second gas control valve further comprises a fuel stream port in fluid communication with a second flow of unreacted fuel from the fuel cell; said first and said second flow dependent on positions of said actuators in said first and second gas control valves.

* * * * *